United States Patent
Kurosawa (10) Patent No.: US 11,501,028 B2
(45) Date of Patent: Nov. 15, 2022

(54) ELECTRONIC DEVICE, AUDIO DEVICE, ELECTRONIC DEVICE CONTROL METHOD AND STORAGE MEDIUM

(71) Applicant: CASIO COMPUTER CO., LTD., Tokyo (JP)

(72) Inventor: Hiroshi Kurosawa, Akishima (JP)

(73) Assignee: CASIO COMPUTER CO., LTD., Tokyo (JP)

(*) Notice: Subject to any disclaimer, the term of this patent is extended or adjusted under 35 U.S.C. 154(b) by 162 days.

(21) Appl. No.: 17/014,210

(22) Filed: Sep. 8, 2020

(65) Prior Publication Data

US 2020/0401735 A1  Dec. 24, 2020

Related U.S. Application Data

(62) Division of application No. 16/138,426, filed on Sep. 21, 2018, now Pat. No. 11,010,497.

(30) Foreign Application Priority Data

Sep. 26, 2017 (JP) .............................. JP2017-185084

(51) Int. Cl.
| | |
|---|---|
| G06F 21/31 | (2013.01) |
| G06F 21/32 | (2013.01) |
| G06F 3/16 | (2006.01) |
| G06F 21/62 | (2013.01) |
| G06F 21/84 | (2013.01) |

(52) U.S. Cl.
CPC .............. *G06F 21/84* (2013.01); *G06F 3/162* (2013.01); *G06F 3/167* (2013.01); *G06F 21/31* (2013.01); *G06F 21/32* (2013.01); *G06F 21/6245* (2013.01); *G06F 2221/2149* (2013.01)

(58) Field of Classification Search
None
See application file for complete search history.

(56) References Cited

U.S. PATENT DOCUMENTS

| | | |
|---|---|---|
| 6,697,299 B2 | 2/2004 | Kato et al. |
| 10,867,019 B2 | 12/2020 | Yano et al. |
| 11,145,222 B2 | 10/2021 | Ichihashi et al. |

(Continued)

FOREIGN PATENT DOCUMENTS

| | | | | |
|---|---|---|---|---|
| EP | 1205884 A2 * | 5/2002 | ............... | G06K 9/00 |
| JP | 2002143130 A | 5/2002 | | |

(Continued)

OTHER PUBLICATIONS

Acoustic Ear Recognition for Person Identification. Akkermans. (Year: 2005).*

(Continued)

*Primary Examiner* — Venkat Perungavoor
(74) *Attorney, Agent, or Firm* — Holtz, Holtz & Volek PC (57) ABSTRACT

An audio device includes a sound emission section which outputs a sound, and a sound reception section to which a sound is inputted. The audio device outputs an acoustic wave into the earhole of the user and authenticates the user based on echo waves created by the earhole. The audio device, when an electronic device is connected thereto, outputs to the electronic device unique authentication information acquired according to an instruction received from the electronic device.

9 Claims, 7 Drawing Sheets

(56) References Cited

U.S. PATENT DOCUMENTS

| | | | |
|---|---|---|---|
| 2004/0141416 A1 | 7/2004 | Kato et al. | |
| 2006/0206582 A1 | 9/2006 | Finn | |
| 2008/0262382 A1* | 10/2008 | Akkermans | G07C 9/37 |
| | | | 600/559 |
| 2013/0298213 A1 | 11/2013 | Macwan | |
| 2015/0161459 A1 | 6/2015 | Boczek | |
| 2016/0119338 A1 | 4/2016 | Cheyer | |
| 2017/0110144 A1 | 4/2017 | Sharifi et al. | |
| 2017/0351848 A1 | 12/2017 | Bakish | |
| 2018/0060555 A1* | 3/2018 | Boesen | H04R 1/1041 |
| 2018/0113673 A1 | 4/2018 | Sheynblat | |
| 2018/0307818 A1* | 10/2018 | Yano | G01N 29/11 |
| 2019/0095653 A1 | 3/2019 | Kurosawa | |
| 2019/0221215 A1 | 7/2019 | Mixter et al. | |
| 2019/0373468 A1 | 12/2019 | Amisano et al. | |
| 2020/0169552 A1 | 5/2020 | Siddiqui et al. | |

FOREIGN PATENT DOCUMENTS

| | | | | |
|---|---|---|---|---|
| JP | 2012164357 A | | 8/2012 | |
| JP | 6172417 B1 | | 7/2017 | |
| WO | WO-2011023323 A1 | * | 3/2011 | ......... G07C 9/00158 |
| WO | 2017069118 A1 | | 4/2017 | |

OTHER PUBLICATIONS

New biometric modalities using internal physical characteristics. Mortenson. Proc. of SPIE. (Year: 2010).*
Personal Identification Using Computerized Human Ear Recognition System. Tariq. IEEE. (Year: 2011).*
Personal Identification Using Ear Recognition. Tariq. Telkomnika. (Year: 2012).*
Inverse solution of ear-canal area function from reflectance. Rasetshwane. JASA. (Year: 2011).*
EarDynamic: An Ear Canal Deformation Based Continuous User Authentication Using In-Ear Wearables. Wang. ACM. (Year: 2021).*
Audio Fingerprinting: Concepts And Applications. Cano et al. SCI. (Year: 2005).
Authentication path: NEC targets acoustic characteristics of ear. Owano. Tech Explore. (Year: 2016).
Hearing Your Voice is Not Enough: An Articulatory Gesture Based Liveness Detection for Voice Authentication. Zhang et al. ACM. (Year: 2017).
Humar ears to become the next authentication factor. Mathur. (Year: 2016).
Visual Speaker Authentication Ensemble Learning Over Static And Dynamic Details. Shi et al. IEEE. (Year: 2016).
Voice live: A Phoeme Localization based Liveness Detection for Voice Authentication on Smartphones. Zhang ACM (Year: 2016).
An Enhanced Authenticated Key Agreement Protocol with a Neural Network-based Model for Joining-Phase in Mobile Environments. Abi-Char. IJEI. (Year: 2011).
Authenticating Sensitive Speech-Recitation in Distance-Learning Applications using Real-Time Audio Watermarking. Tayan. IJACSA. (Year: 2016).
Automated Lip Reading Technique for Password Authentication. Sengupta. IJAIS. (Year: 2012).
Biometric Dynamic Personality Authentication in Open Information Space. Akhmetov. IJCTA. (Year: 2013).
Notice of Allowance dated Feb. 11, 2021 issued in related U.S. Appl. No. 16/138,426.
Support Vector Machine based approach for Quranic Words Detection in Online Textual Content. Sabbah. IEEE. (Year: 2014).
Office Action (Final Rejection) dated Oct. 21, 2020, issued in related U.S. Appl. No. 16/138,426.
Japanese Office Action dated Aug. 30, 2021 (and English translation thereof) issued in Japanese Application No. 2017-185084.

* cited by examiner

|  | CONNECTION OF EARPHONES WITH MICROPHONE | CONNECTION OF EARPHONES WITHOUT MICROPHONE | DETACHMENT OF EARPHONES WITH MICROPHONE |
|---|---|---|---|
| EXTERNAL MICROPHONE MODE | SETTING HOLD | SETTING HOLD | MAIN BODY MICROPHONE ENABLING SETTING CHANGE |
| MAIN BODY MICROPHONE MODE | MICROPHONE SETTING CHANGE CONFIRMATION DISPLAY | SETTING HOLD | SETTING HOLD |

FIG. 6

ELECTRONIC DEVICE, AUDIO DEVICE, ELECTRONIC DEVICE CONTROL METHOD AND STORAGE MEDIUM

CROSS-REFERENCE TO RELATED APPLICATION

This application is a Divisional application of U.S. application Ser. No. 16/138,426, filed on Sep. 21, 2018, which is based upon and claims the benefit of priority from the prior Japanese Patent Application No. 2017-185084, filed Sep. 26, 2017, the entire contents of which are incorporated herein by reference.

BACKGROUND OF THE INVENTION

1. Field of the Invention

The present invention relates to an electronic device having a personal authentication function to identify a user, an audio device, an electronic device control method and a storage medium.

2. Description of the Related Art

In recent years, remarkable is spread of a smart phone, a tablet terminal, a portable game machine, and a portable electronic device such as various types of electronic learning devices including an electronic dictionary. In recent years, in particular, a type and amount of information which can be stored and accessed have become huge by enhancing performance of an electronic device, achieving a larger capacity of a built-in memory, and forming the built-in memory into a cloud through a communication channel. In addition to such a background, under the assumption that a portable electronic device is basically used only by a user, cases have increased where various information and data unique to a user (hereinafter referred to as "personal data" collectively) are stored in an electronic device.

On the other hand, in accordance with the spread of portable electronic devices in recent years, their usage has increased in an education field such as a school or a coaching school and a field of individual learning related to English conversation or a certification examination. For that reason, it is required to improve certainty of protection of personal data such as a learning plan and the progress thereof and an achievement level (results) of learning.

In such a portable electronic device, in order to restrict access to personal data other than a user, a method of identifying a user by personal authentication technology using a password, a pattern, and an biological information unique to the user which are set up in advance is adopted generally. For example, as personal authentication technology using biological information, one which uses an vein image, a finger print, a voiceprint, a shape of a face, and an iris of an eye or the like as is described in Japanese Patent Application Laid-Open (Kokai) Publication No. 2012-164357 is known. Incidentally, such personal authentication technology is widely used also as a method of restricting access to important information or confidential information in the government, municipal offices, an educational institution and a nonfinancial company or the like.

The present invention is advantageous in that an electronic device, an audio device, an electronic device control method and a storage medium are provided by which personal authentication can be performed by a simple and suitable method and whereby personal data can be used appropriately.

SUMMARY OF THE INVENTION

In accordance with one aspect of the present invention, there is provided an electronic device comprising: a processor, wherein the processor, when an audio device is connected which has a sound emission section which outputs a sound and a sound reception section in which a sound is inputted, instructs the audio device to acquire unique authentication information, and wherein the processor performs personal authentication of a user wearing the audio device based on the authentication information from the audio device.

In accordance with another aspect of the present invention, there is provided an audio device comprising: a sound emission section which outputs a sound; and a sound reception section in which a sound is inputted, wherein the audio device, when an electronic device is connected thereto, outputs to the electronic device unique authentication information acquired in accordance with an instruction received from the electronic device so as to acquire the authentication information.

In accordance with another aspect of the present invention, there is provided a control method for an electronic device, comprising: transmitting an instruction signal to an audio device connected to the electronic device; acquiring, from the audio device, unique authentication information of a user based on an echo wave of a sound outputted from the audio device to the user wearing the audio device in response to the instruction signal; and performing personal authentication of the user based on the authentication information.

In accordance with another aspect of the present invention, there is provided a non-transitory computer-readable storage medium having stored thereon a program that is executable by a computer in an electronic device to actualize functions comprising: transmitting an instruction signal to an audio device connected to the electronic device; acquiring, from the audio device, unique authentication information of a user based on an echo wave of a sound outputted from the audio device to the user wearing the audio device in response to the instruction signal; and performing personal authentication of the user based on the authentication information.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Hereafter, embodiments of an electronic device, an audio device, a control method for the electronic device, and a storage medium according to the present invention will be described in detail. In the present embodiment, a case is described in which the electronic device and the audio device according to the present invention are applied to an electronic learning device.

(Electronic Device)

Figure 1A:
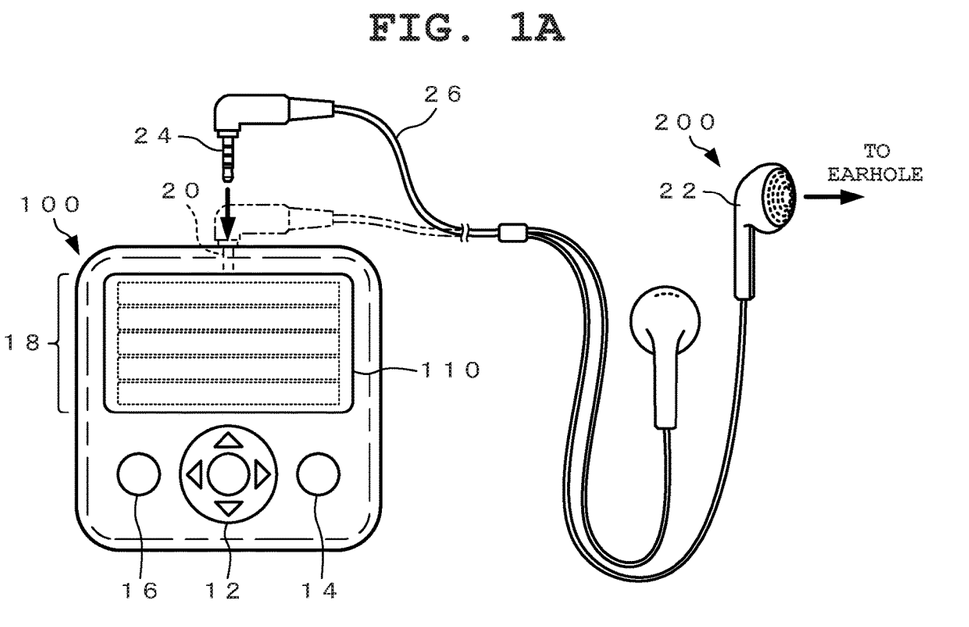
FIG. 1A and FIG. 1B are each a schematic diagram showing an embodiment of an electronic device according to the present invention.
Figure 1B:
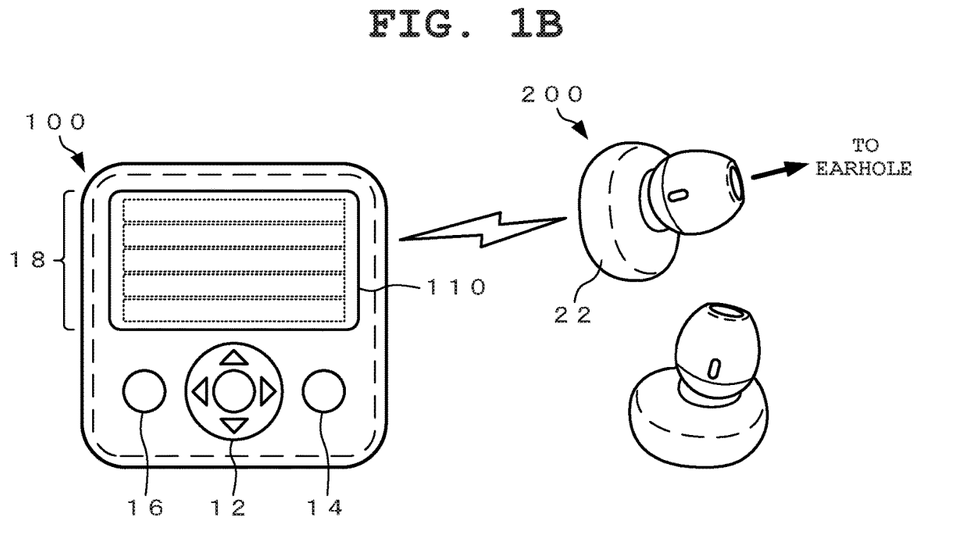
Figure 2A:
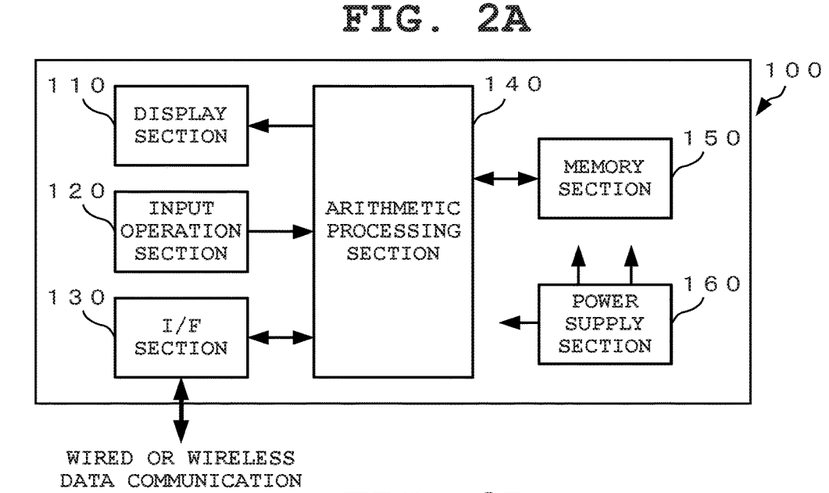
FIG. 2A is a drawing showing an example of a function block of the electronic device according to the embodiment.
Figure 2B:
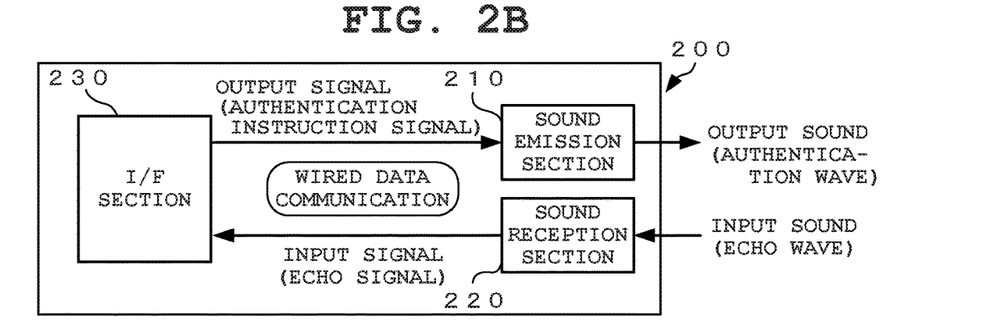
FIG. 2B and FIG. 2C are each a drawing showing an example of a function block of an audio device connected to the electronic device.
Figure 2C:
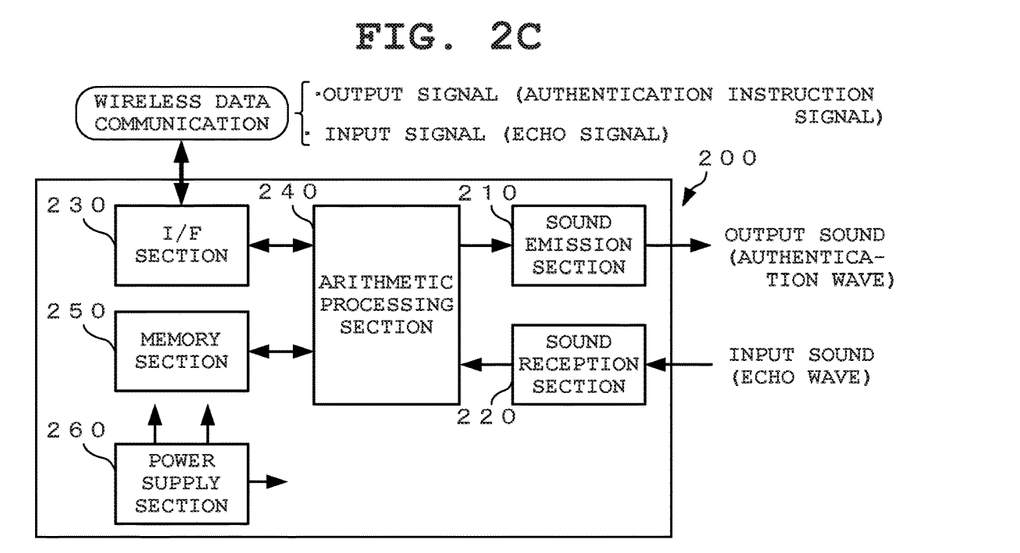

FIG. 1A and FIG. 1B are each a schematic diagram showing an embodiment of the electronic device according to the present invention. FIG. 1A is a drawing showing a first example (wired connection) of a connection configuration between the electronic device and the audio device, and FIG. 1B is a drawing showing a second example (wireless connection) of a connection configuration between the electronic device and the audio device. FIG. 2A to FIG. 2C are block diagrams showing an example of function configurations applied to the electronic device according to the present embodiment. FIG. 2A is a drawing showing an example of a function block of the electronic device, and FIG. 2B and FIG. 2C are each a drawing showing an example of a function block of the audio device connected to the electronic device.

The electronic device according to the present embodiment is an electronic learning device which is used for foreign language learning including English-conversation learning or is applied to an electronic dictionary etc. In the electronic device 100 of the present embodiment, an audio device 200 can be wired or wirelessly connected so that data communication is possible having an input/output function for listening to the sound of a voice or the like based on data inputted from the electronic device 100 and then outputting emitted sound such as voice to the electronic device 100 as data, as shown in FIG. 1A and FIG. 1B.

For example, the electronic device 100 has a function to aurally or visually provide the user with information such as English words, English sentences, explanatory notes, and the like based on a learning plan set in advance and/or search results of words and phrases. In addition, the electronic device 100 has a function to aurally provide the user with information such as English words, English sentences, and explanatory notes by a voice and/or a musical sound via the audio device 200 worn in an ear, judge a speaking or talking level, and search words and phrases based on a voice inputted by the user. In addition, the electronic device 100 has a function to perform personal authentication processing by acquiring authentication information based on biological information unique to the user from the audio device 200 worn in the user's ear.

The electronic device 100 mainly includes, for example, a display section 110, an input operation section 120, an interface section (hereinafter abbreviated as "I/F section") 130, an arithmetic processing section 140, a memory section 150, and a power supply section 160, as shown in FIG. 2A.

The display section 110 includes a liquid crystal display (LCD), an organic electroluminescence display (ELD), an electronic paper display, or the like capable of displaying characters, numbers, illustrations, graphs, and the like, and displays various pieces of information based on operations performed by the user via the input operation section 120 or processing performed inside the electronic device 100.

The input operation section 120 includes, for example, button switches 12, 14 and 16 constituted by hardware keys arranged around the display section 110 or on a side portion or the like of the housing of the electronic device 100, and a touch switch 18 which is a software key using a touch panel formed integrally with the display section 110, as shown in FIG. 1A and FIG. 1B.

Here, in a case where the electronic device 100 is applied to a widely-used electronic learning device such as an English-conversation learning machine or an electronic dictionary as shown in FIG. 1A and FIG. 1B, as the input operation section 120, a selection key and a determination button for selecting examination sentences according to menus or learning plans displayed on the display section 110 and other various items, a play button for performing voice-outputting of English words, English sentences, or explanatory notes displayed on the display section 110, and a function key and a menu key for performing or setting various functions such as data communication with the audio device 200 and personal authentication processing for identifying a user are provided in the form of a hardware key or a software key. For example, the selection key and the determination button are the button switch 12 and the touch switch 18, the play button is the button switch 14, and the function key and the menu key are the button switch 16 and the touch switch 18. By operating these switches, the user displays desired English words, English sentences, or explanatory notes on the display section 110 so as to output a voice from the audio device 200, displays a learning progress or an achievement level of the user on the display section 110, or selects various types of functions and/or menus.

The I/F section 130, which functions at least as an interface for performing data communication between the electronic device 100 and the audio devices 200 connected to the electronic device 100, transmits an output signal for outputting (emitting) a voice or a musical sound from the audio device 200, and receives a voice or the like inputted into (received by) the audio device 200 as an input signal. In addition, the I/F section 130 transmits an authentication instruction signal to the audio device 200 in accordance with an instruction from the arithmetic processing section 140, and receives an echo signal based on an echo wave acquired by the audio device 200.

Here, for data communication by the I/F section 130, a wired communication method where data communication is performed via an earphone cable 26 as shown in FIG. 1A, or a wireless communication method where data communication is performed by a widely used wireless communication standard such as Wi-Fi (wireless fidelity (registered trademark)) or Bluetooth (registered trademark) as shown in FIG. 1B is adopted. In a case where the wired communication method is adopted for data communication with the audio device 200, the I/F section 130 includes an earphone jack 20 for transmitting or receiving signals such as voices to or from the audio device 200 as shown in FIG. 1A.

Note that the I/F section 130 may be one which is connected to a network where public use of the Internet is possible or to a limitedly available network which is provided by a specific organization such as a company or an educational institution, and has a function to serve as an interface for transmitting or receiving data stored in the memory section 150 or data stored in a server on a network to or from the server.

The arithmetic processing section 140 includes a processor such as a CPU (Central Processing Unit) and an MPU (Microprocessor) or a computer provided with the processor, and executes a control program in a storage medium stored in the memory section 150. As a result, the arithmetic processing section 140 controls the display of the user's desired English word or English sentence, explanatory note, a learning progress, an achievement level, a menu, and the like on the display section 110 in accordance with the user's operations on the input operation section 120, controls the input or output of a voice in the audio device 200, and controls various functions such as processing for judging a speaking level or a conversation level based on a received voice or the like.

In the present embodiment, in particular, the arithmetic processing section 140 executes a control of transmitting an authentication instruction signal to the audio device 200 connected to the I/F section 130 and receiving an echo signal based on an echo wave reflected inside the user's earhole. Then, the arithmetic processing section 140 executes personal authentication processing to identify the user wearing the audio device 200 based on the received echo signal, judges the propriety of access to the personal data of the user in accordance with a result of the authenticating processing, and controls an execution state of learning plans and/or functions using the personal data.

The memory section 150 includes a RAM (Random Access Memory) and a ROM (Read Only Memory), and data of an English word, an English sentence, and a search phrase inputted or instructed by a user by an operation on the input operation section 120, data associated with various functions as the electronic learning device, and data associated with personal authentication processing that is executed based on data communication with the audio device 200 are stored in the RAM. In addition, a control program and the like that are executed in the arithmetic processing section 140 are stored in the ROM.

Note that the memory section 150 may have a configuration where at least a part of the ROM is included in the arithmetic processing section 140. In this configuration, the control program may be incorporated in the arithmetic processing section 140 in advance. In addition, the memory section 150 may be structured such that it is partially or entirely in the form of a removable storage medium such as a memory card, and is removable from the electronic device 100. In addition, the above-described data or the like related to personal authentication processing may be partially or entirely stored in a server or the like on a network connected via the I/F section 130, in place of the memory section 150.

The power supply section 160 supplies a driving electric power to each section of the electronic device 100. To the power supply section 160, not only a widely used primary battery or rechargeable battery as an operating power source but also an electric power source or the like may be applied which is based on environmental power generation (energy harvesting) technology where an electric power is generated based on energies such as vibration, light, heat, and electromagnetic waves.

The audio device 200, which is an audio device (headset) such as earphones with inner or canal type microphones, is worn in the user's ears or worn on the head, and can input or output a voice or the like. The audio device 200 is connected such that data communication with the electronic device 100 is possible, and has a function to output (emit) a voice or a musical sound in accordance with an output signal from the electronic device 100 and transmit an input signal in accordance with a voice or the like inputted (received) from the user to the electronic device 100. In addition, the audio device 200 has a function to acquire biological information unique to the user as authentication information based on an instruction from the electronic device 100.

When a wired connection is enabled in the electronic device 100 as shown in FIG. 1A, the audio device 200 is mainly constituted by a sound emission section 210, a sound reception section 220 and an I/F section 230 as shown in FIG. 2B. Also, when a wireless connection is enabled in the electronic device 100 as shown in FIG. 1B, the audio device 200 is mainly constituted by the sound emission section 210, the sound reception section 220, the I/F section 230, an arithmetic processing section 240, the memory section 250 and the power supply section 260 as shown in FIG. 2C. Here, the descriptions are simplified for the equivalent sections in above-described electronic device 100.

The sound emission section 210, which is sound emission means such as an earphone or a speaker provided in a housing 22 that is worn in the user's earhole, receives an output signal transmitted from the electronic device 100 via the I/F section 230, converts it into a sound signal such as a voice or a musical sound, and outputs it inside the user's earhole wearing the audio device 200. In addition, the sound emission section 210 converts an authentication instruction signal transmitted from the electronic device 100 into an acoustic wave having a specific frequency, and outputs it into the user's earhole as an authentication wave.

The sound reception section 220, which is sound collection means such as a microphone provided in the above-described housing 22, converts a voice or the like inputted from the user via the user's external auditory canal into an electrical signal and transmits it to the electronic device 100 as an input signal via the I/F section 230. In addition, the sound reception section 220 converts an echo wave inputted (taken in) by an authentication wave outputted from the sound emission section 210 being reflected inside the user's earhole into an electrical signal and transmits it to the electronic device 100 as an echo signal via the I/F section 230. Here, the echo wave inputted into the sound reception section 220 or the echo signal based on the echo wave corresponds to authentication information based on biological information unique to the user.

The I/F section 230, which functions as an interface for performing data communication with the electronic devices 100 connected to the audio device 200, receives an output signal for outputting (emitting) a voice or a musical sound from the sound emission section 210 (emitting sound), and transmits a voice or the like inputted into the sound reception section 220 (receiving sound) as an input signal. In addition, the I/F section 230 receives an authentication instruction signal transmitted from the electronic device 100, and transmits an echo signal based on an echo wave inputted into the sound reception section 220 to the electronic device 100.

Here, in the case of a wired connection of the audio device 200 to the electronic device 100, the I/F section 230 includes an earphone plug 24 and an earphone cable 26 as shown in FIG. 1A, and performs data communication with the electronic device 100 by the earphone plug 24 being inserted into and electrically connected with the earphone jack 20 in the I/F section 130 of the electronic device 100. In addition, in the case of a wireless connection of the audio device 200 to the electronic device 100 as shown in FIG. 1B, the I/F section 230 performs data communication with the electronic device 100 by widely used wireless communication standards such as Wi-Fi (wireless fidelity (registered trademark)) described above, Bluetooth (registered trademark), or near field communication (NFC) as non-contact communication.

The arithmetic processing section 240, in the case where the audio device 200 is wirelessly connected to the electronic device 100, includes a processor such as a CPU, an MPU, or a computer, and executes a prescribed control program stored in the memory section 250. As a result, the arithmetic processing section 240 controls a wireless connection state with the electronic device 100 in the I/F section 230, and controls transmission or reception of a signal such as a voice or a signal associated with personal authentication processing.

The memory section 250 has stored therein a control program or the like that is executed in the arithmetic processing section 240. Here, the memory section 250 may be partially included in the arithmetic processing section 240 and, in that case, the control program may be incorporated in the arithmetic processing section 240 in advance.

The power supply section 260 supplies driving electric power to each section of the audio device 200. To the power supply section 260, a widely used primary battery or rechargeable battery as an operating power source are applicable, for example. Here, the audio device 200 is activated by driving electric power being supplied to each section from the power supply section 260 in accordance with an operation on an electric power switch not shown, and then an operation to establish wireless connection to the electronic device 100 is executed.

In the present embodiment, as means for inputting or outputting the user's voice or the like, only the audio device 200 such as an earphone with a microphone has been described which can be wired or wirelessly connected to the I/F section 130 of the electronic device 100. However, the present invention is not limited thereto. That is, the electronic device 100 may be structured to have a sound section therein which is constituted by a microphone and a speaker for outputting and inputting the user's voice or the like, in addition to the above-described audio device 200.

(Control Method for Electronic Device)

Next, a control method and a control program for the electronic device 100 according to the present embodiment are described with reference to the drawings. Here, a case is described in which the electronic device 100 has been applied to an electronic learning device for English-conversation learning such as those shown in FIG. 1A and FIG. 1B.

When the electronic device 100 is activated before an authentication setup, the arithmetic processing section 140 performs initial setting for authentication. Specifically, in the case of wired connection, when the earphone plug 24 of the audio device 200 is inserted into the earphone jack 20 of the electronic device 100, the arithmetic processing section 140 judges whether there is any authentication data registered in the memory section 150 or an external server. When there is no registration data, the arithmetic processing section 140 of the electronic device 100 outputs an authentication instruction signal to the audio device 200 via the I/F section 130.

Then, the audio device 200 outputs an authentication wave from the sound emission section 210 in accordance with the authentication instruction signal received from the I/F section 230. The user wears the audio device 200 in the ears, an echo wave created by an authentication wave being echoed inside the user's ear is inputted into the sound reception section 220, and the sound reception section 220 outputs an input signal according to the echo wave. The audio device 200 outputs the input signal from the I/F section 230 and, when the input signal received from the I/F section 130 or a component which has been extracted from the input signal and by which the individual can be specified is stabilized, the electronic device 100 registers the input signal or the component into the memory section 150 or the external server.

In the case of wireless connection, when a connection is established by predetermined wireless communication standards between the electronic device 100 and the audio device 200, the arithmetic processing section 140 of the electronic device 100 judges whether there is any authentication data registered into the memory section 150 or the external server. When there is no registration data, the arithmetic processing section 140 outputs an authentication instruction signal to the audio device 200 via the I/F section 130. Then, the audio device 200 outputs an authentication wave from the sound emission section 210 in accordance with the authentication instruction signal received from the I/F section 230. The user wears the audio device 200 in the ears, an echo wave created by an authentication wave being echoed inside the user's ear is inputted into the sound reception section 220, and the sound reception section 220 outputs an input signal according to the echo wave. The audio device 200 outputs the input signal from the I/F section 230 and, when the input signal received from the I/F section 130 or a component which has been extracted from the input signal and by which the individual can be specified is stabilized, the electronic device 100 registers the input signal or the component into the memory section 150 or the external server.

Figure 3:
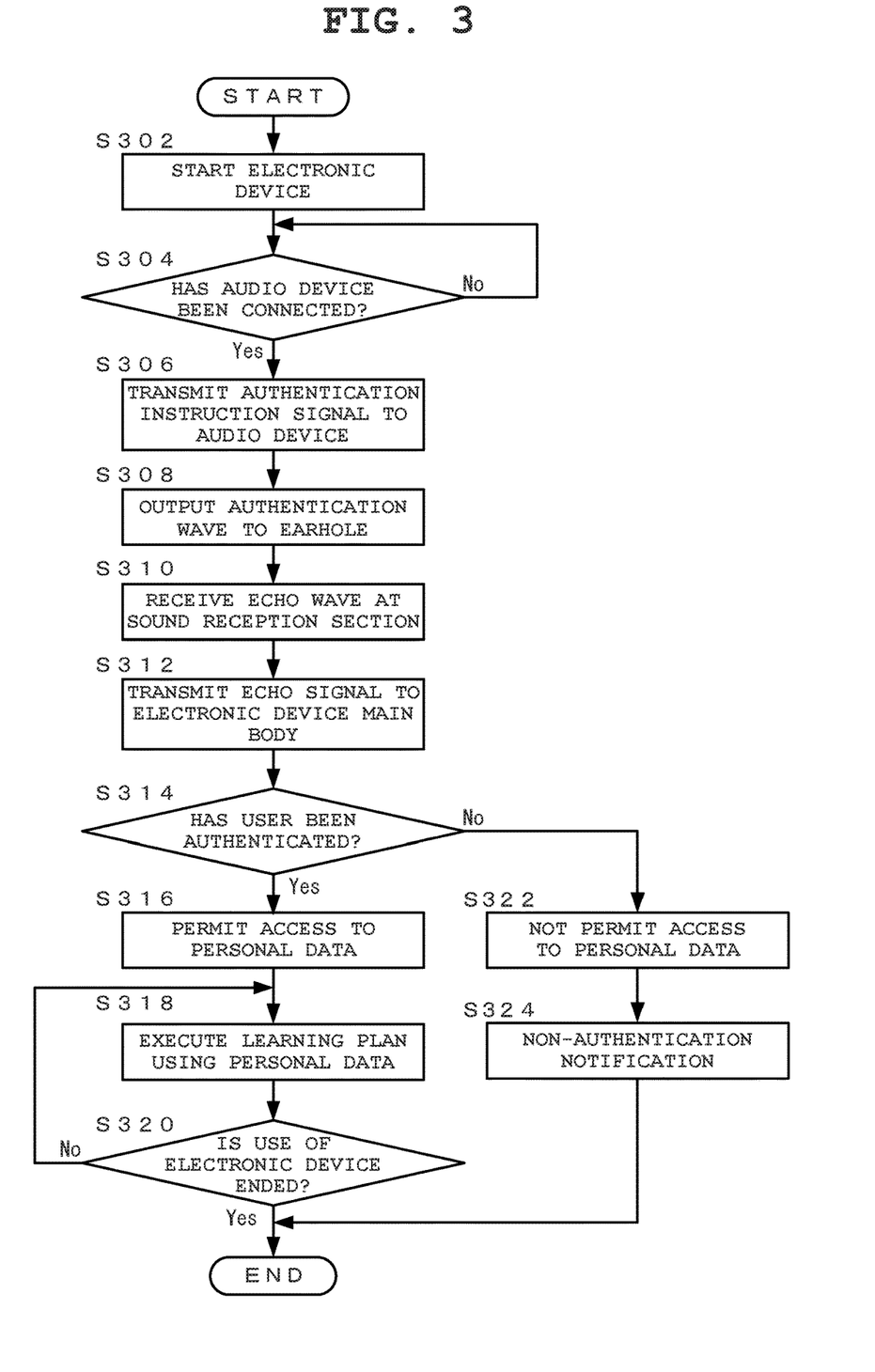
FIG. 3 is a flowchart showing an example of a control method for the electronic device according to the embodiment.
Figure 4A:
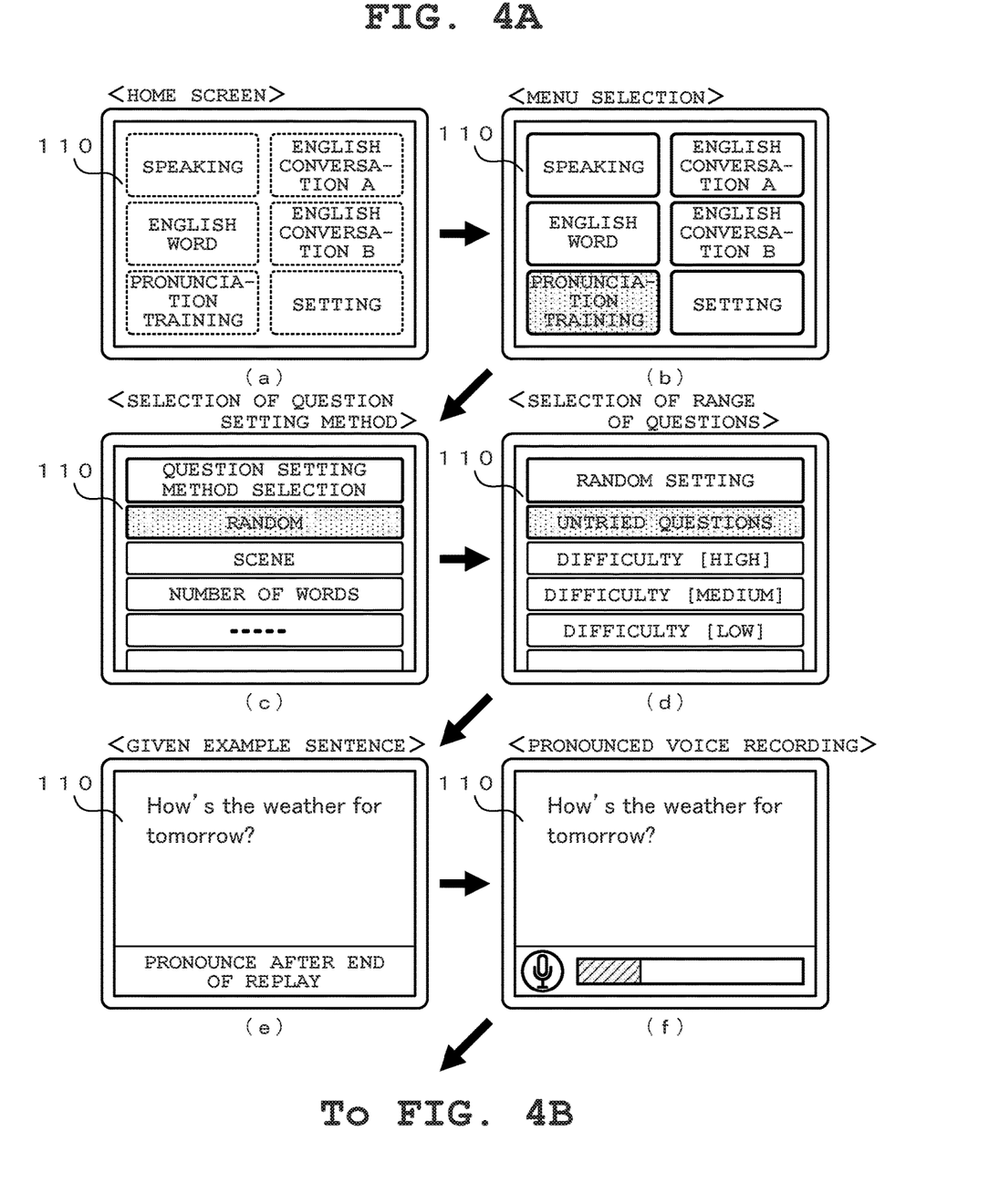
FIGS. 4A and 4B are screen transition diagrams showing an example of the screen display of a learning plan (at the time of authentication) that is executed in the electronic device according to the embodiment.
Figure 4B:
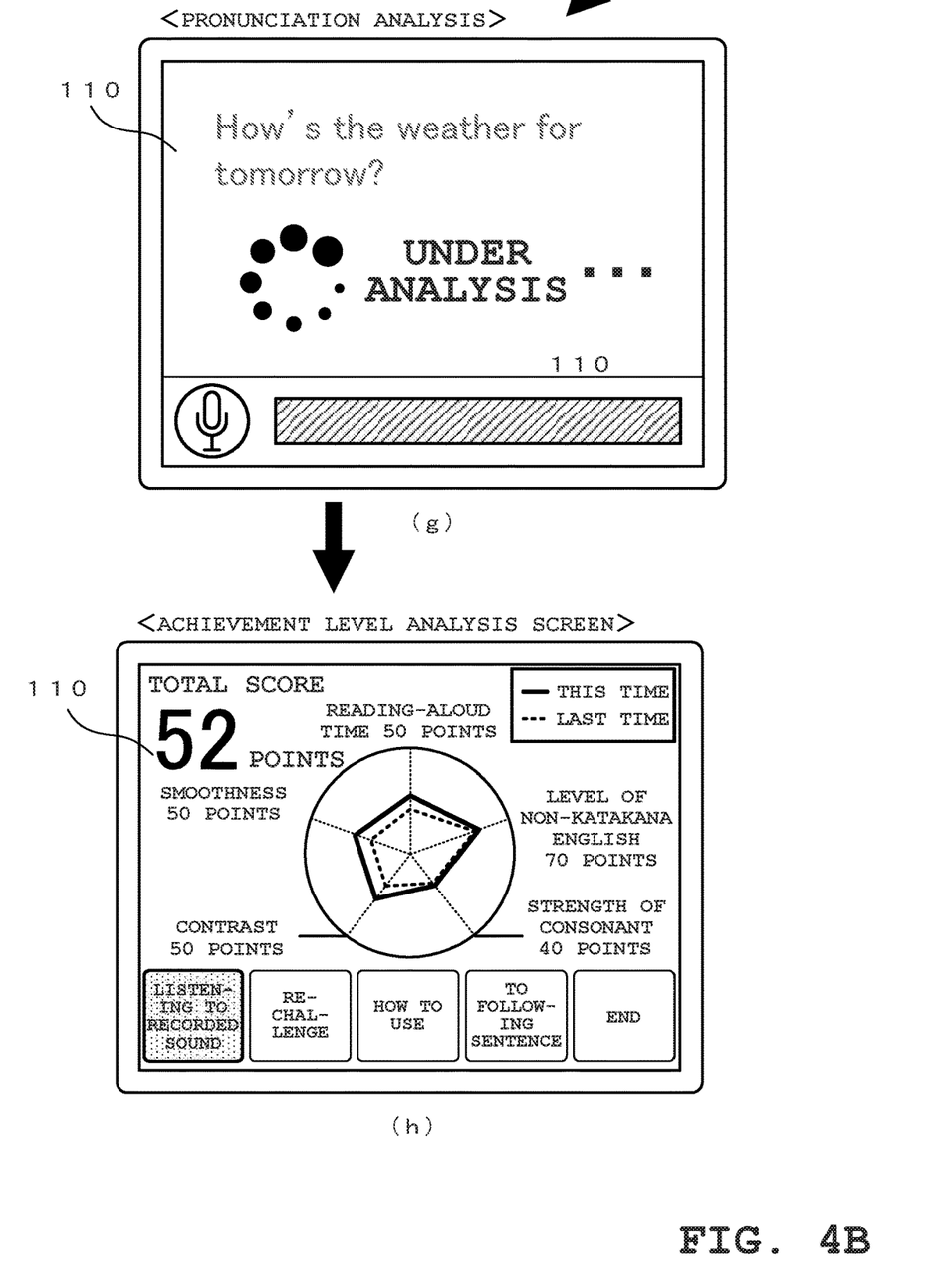

FIG. 3 is a flowchart showing an example of the control method for the electronic device 100 according to the present embodiment, FIGS. 4A and 4B are screen transition diagrams showing an example of the screen display of a learning plan (at the time of authentication) that is executed in the electronic device 100 according to the present embodiment.

In the control method for the electronic device 100 according to the present embodiment, processing is performed to judge the propriety of the execution of personal authentication processing related to the user based on the connection state of the audio device 200 to the electronic device 100. In addition, personal authentication processing is performed to identify the user based on authentication information acquired by the audio device 200. Furthermore, processing is performed to judge the propriety of access to the personal data of the user based on the result of the personal authentication processing, and to control the execution state of a learning plan or function using the personal data. These processing operations are actualized by a specific program being executed in the arithmetic processing section 140 of the electronic device 100, or the arithmetic processing section 140 of the electronic device 100 and the arithmetic processing section 240 of the audio device 200.

In the control method for the electronic device 100 according to the present embodiment, when the audio device 200 is enabled with a wired connection to the electronic device 100 as shown in FIG. 1A, and the user activates the electronic device 100 (Step S302), the arithmetic processing section 140 controls the electronic device 100 to be held in a wait state until the earphone plug 24 of the audio device 200 is inserted into the earphone jack 20 of the electronic device 100 and electrically connected as shown in a flowchart of FIG. 3. Note that a configuration may be adopted in which, when the earphone plug 24 of the audio device 200 is inserted into the earphone jack 20 of the electronic device 100 in a sleep state where main functions other than a function to detect insertion to the earphone jack 20 have been suspended, the electronic device 100 is activated.

On the other hand, when the audio device 200 is enabled with a wireless connection to the electronic device 100 as shown in FIG. 1B, and the user activates the electronic device 100 and the audio device 200 (Step S302), the arithmetic processing sections 140 and 240 controls the electronic device 100 and the audio device 200 to be held in a wait state until the connection state based on the predetermined wireless communication standards is established between the electronic device 100 and the audio device 200. Here, when the electronic device 100 is activated, the arithmetic processing section 140 displays a home screen (or menu screen) such as that shown in FIG. 4A (a) on the display section 110. On the home screen, a menu list and icons (such as "SPEAKING", "PRONUNCIATION TRAINING", "ENGLISH CONVERSATION A") indicating various types of learning plans and setting items in English-conversation learning are displayed.

In this waiting state, the arithmetic processing section 140 monitors to judge whether or not the audio device 200 has been wired or wirelessly connected to the electronic device 100, constantly or at predetermined timing (Step S304). When judged that the audio device 200 has not been connected (No at Step S304), the arithmetic processing section 140 maintains the above-described waiting state. When judged that the audio device 200 has been connected (Yes at Step S304), the arithmetic processing section 140 executes processing (authentication information acquisition processing) for acquiring authentication information unique to the user wearing the audio device 200 in the ears.

In this authentication information acquisition processing, the arithmetic processing section 140 first transmits an authentication instruction signal for acquiring the authentication information unique to the user to the audio device 200 via the I/F section 130 (Step S306). When the authentication instruction signal transmitted from the electronic device 100 is received via the I/F section 230, the audio device 200 converts the authentication instruction signal into an acoustic wave having a specific frequency in the sound emission section 210 and outputs the acoustic wave into the user's earhole as an authentication wave (Step S308). Then, the authentication wave outputted from the sound emission section 210 is reflected inside the user's earhole and inputted into the sound reception section 220 as an echo wave. The audio device 200 converts this echo wave into an electrical signal (Step S310) and transmits it to the electronic device 100 as an echo signal via the I/F section 230 (Step S312).

Next, when the electronic device 100 receives the echo signal transmitted from the audio device 200 via the I/F section 130, the arithmetic processing section 140 executes personal authentication processing which identifies the user based on the authentication information included in the echo signal (Step S314).

More specifically, it is known that the shape of the human earhole generally differs for each individual. Accordingly, in the present embodiment, attention is focused on audio devices, such as earphones with a microphone which are indispensable components in electronic learning devices, such as English-conversation learning machines. The authentication wave is outputted to the user's earhole wearing the audio device 200, and an echo wave acquired by the authentication wave being reflected in accordance with the shape of the inside of the earhole and inputted is received as an echo signal. The arithmetic processing section 140 acquires the waveform (namely, acoustic properties inside the earholes) of the echo wave contained in the echo signal as authentication information unique to the user, and executes personal authentication processing to authenticate the user by comparing the authentication information with authentication information (acoustic properties inside the earholes) stored (registered) in advance in the memory section 150 or the like.

In this method for acquiring authentication information unique to a user, the inner or canal type earphone applied as the audio device 200 can be worn in the user's earhole with it being in close contact with the earhole. Therefore, this acquisition method has an advantageous effect in that an echo wave corresponding to the shape of the inside of an earhole can be favorably acquired, whereby personal authentication processing for identifying a user can be appropriately performed.

In the above-described personal authentication processing (Step S314), when the user who is currently using the electronic device is identified and the user is authenticated to be the person registered in advance (Yes at Step S314), the arithmetic processing section 140 permits the user to access personal data such as data accumulated in relation to the user and information registered by the user in the past (Step S316), and executes browsing or updating of the personal data, or performs a learning plan or a function using the personal data (Step S318).

Here, permitting access to the personal data at the above-described Step S316 means not only allowing to read and brows past records such as learning plans or learning results of the user from the memory section 150, but also allowing to newly create personal data or to perform update and store of data.

The learning plan using the personal data at the above-described Step S318 is described using English-conversation learning as an example. First, when the user of the electronic device 100 is authenticated, the arithmetic processing section 140 changes display as shown in FIG. 4A(b) by changing the menu list, the design of an icon, brightness, and the like on the home screen on the display section 110 shown in FIG. 4A(a), and displays a message indicating that the user has been authenticated so as to notify the user of the change to a state of being authenticated or a state where a learning plan using personal data can be performed. The initial screen at the time of personal authentication may be the home screen or a screen displayed last time by the authenticated user ending operations.

Next, when the user selects an arbitrary item on the menu list ("PRONUNCIATION TRAINING" in FIG. 4A(b)) on the home screen, the arithmetic processing section 140 reads the personal data of the user from the memory section 150, and executes the selected learning plan. Next, the arithmetic processing section 140 performs display for inputting execution conditions in the learning plan ("QUESTION SETTING METHOD" shown in FIG. 4A(c), "RANGE OF QUESTIONS" shown in FIG. 4A(d)), and the like into the display section 110. Here, the arithmetic processing section 140 refers to a past record related to the same learning plan executed by the user in the past and, if there is a question range that has not been given, displays this range on the menu list as a range of questions.

Then, when the user inputs arbitrary execution conditions and the like, the arithmetic processing section 140 gives an example sentence based on these conditions as shown in FIG. 4A(e) by displaying it on the display section 110, and replays and outputs a voice pronouncing the example sentence with a typical (that is, native) accent via the audio device 200. Here, after replaying and outputting this model voice pronouncing the example sentence, the arithmetic processing section 140 displays on the display section 110 a message prompting the user to pronounce the example sentence. When the user inputs the example sentence via the audio device 200 in response to the message, the arithmetic processing section 140 records this user's voice, as shown in FIG. 4A(f).

Next, the arithmetic processing section 140 executes pronunciation analysis processing based on comparison between the user's recorded voice data and the model voice data for the given example sentence, as shown in FIG. 4B(g). Here, for example, elements such as smoothness, contrast, consonant strength, reading-aloud time and the like of the pronunciation are compared against the user's pronouncing. After the end of the pronunciation analysis processing, the arithmetic processing section 140 displays an analysis result on the display section 110 in the form of a score, a circle graph, etc. which are easier to understand, as shown in FIG. 4B(h). Here, when an analysis result of the same learning plan executed by the user in the past (for example, last time) has been accumulated in the memory section 150, the arithmetic processing section 140 displays such that comparison between the analysis result acquired this time and the previous analysis result can be performed. In addition, the result (namely, learning result) of the pronunciation analysis processing acquired this time is stored for updating, or newly stored as personal data in the memory section 150 together with the progress status and the like of the learning plan. As a result, the user can accurately grasp change in the user's achievement level related to pronunciation and reflect it in the improvement of the achievement level in the future.

After the series of processing for the learning plan is completed, when the electronic device is not ended (is continued to be used) (No at Step S320), the arithmetic processing section 140 returns to Step S318 and displays the home screen again on the display section 110, and continues the state where the user can access the personal data or execute a learning plan using the personal data. On the other hand, when the audio device 200 is removed from the electronic device 100 and the user performs a turn off operation on the electric power switch (Yes at Step S320), the arithmetic processing section 140 ends or suspends all the operations in the electronic device. Note that this end judgment processing at Step S320 is performed not only when the series of processing for the learning plan is ended, but also when the audio device 200 is removed from the electronic device 100 or a turn off operation is performed on the electric power switch by the user during the learning plan. In this case, the arithmetic processing section 140 records, as a log, the progress state and the learning result of the learning plan updated or newly created before the operation of the electronic device is ended or suspended so as to update the personal data or store the log as new personal data in the memory section 150

On the other hand, in the above-described personal authentication processing (Step S314), when the user currently using the electronic device is not authenticated to be the person registered in advance (No at Step S314), the arithmetic processing section 140 does not permit access to the user's personal data registered in advance (Step S322), provides a notification by displaying an message indicating that the user is not authenticated (Step S324), and ends or suspends all the operations in the electronic device 100 so that the electronic device 100 enters a state of not being used.

Note that a configuration may be adopted in which, in the above-described personal authentication processing (Step S314), the arithmetic processing section 140 judges adequacy in advance with respect to the waveform (namely, acoustic properties inside the earholes) of the echo wave acquired by the audio device 200. That is, when judged that the echo wave is not suitable for the personal authentication processing because the wave amplitude of the reflected wave is very small, a noise component has been significantly mixed thereinto, or the like, the arithmetic processing section 140 repeatedly executes processing to acquire an echo wave (Steps S306 to S312) while repeatedly transmitting an authentication instruction signal to the audio device 200 until an echo signal based on an effective echo wave is acquired. This processing to acquire an echo signal is repeatedly executed by a predetermined number of times or for a predetermined period and, when no effective echo signal is acquired the predetermined number of times or within the predetermined period, the arithmetic processing section 140 does not permit access to the personal data as with the above-described Steps S322 and S324, and ends or suspends all the operations in the electronic device 100, so that the electronic device 100 enters a state of not being used after displaying on the display section 110 a message indicating that the user is not authenticated.

Also, a configuration may be adopted in which, when the user is not authenticated (No at Step S314) in the above-described personal authentication processing (Step S314), the arithmetic processing section 140 executes a series of processing operations (non-permission of access to personal data, execution of a learning plan which does not use personal data, and judgment to end the electronic device) of Steps S622 to S626 shown in the modification example (flowchart of FIG. 6) described later, in place of the processing operations shown in the above-described Steps S322 to S324.

As described above, in the configuration of the present embodiment where the audio device 200 is connected to the electronic device 100 and used, personal authentication processing which identifies a user wearing the audio device 200 is executed, and the propriety of access to the personal data of the user is judged based on an echo wave acquired by an authentication wave outputted from the sound emission section 210 of the audio device 200 being echoed inside the user's earhole and inputted into the sound reception section 220.

As a result of this configuration, by using an audio device which is used for usual operations (learning plans and the like) in an electronic device, a user can execute personal authentication processing which appropriately identifies the user only by wearing the audio device in the ears as a series of learning preparations without performing an operation aimed only at personal authentication, and can favorably view or update the personal data of the user, or use a learning plan or a function using the personal data, without adding new components to the electronic device. In particular, since the enhancement of conversation capability is considered as important in a field of language learning including a field of school education, products using earphones or headphones having a microphone function have become widely used for electronic learning devices for conversation learning for the language of each country. The present invention can be favorably applied to these electronic devices.

In the present embodiment, when a user change is to be made from a registered user A to an unregistered user B, or when the unregistered user B is additionally registered as a user in addition to the registered user A, the registered user A performs a series of personal authentication operations where the processing of Step S302 to Step S314 are executed using the audio device 200 and the electronic device 100, so that a state is achieved in which a registration change or an additional setup can be performed. Then, the electronic device 100 enters a mode for a registration change or an additional registration by an input operation for registration being performed by the input operation section 120 of the electronic device 100. Thereafter, the user B performs initial setting for the above-described authentication, whereby the registration is completed. In a case where a registered user is deleted, the same operations are performed except that, in place of the input operation for registration, an input operation for deletion is performed by the input operation section 120 of the electronic device 100.

Modification Example

Figure 5:
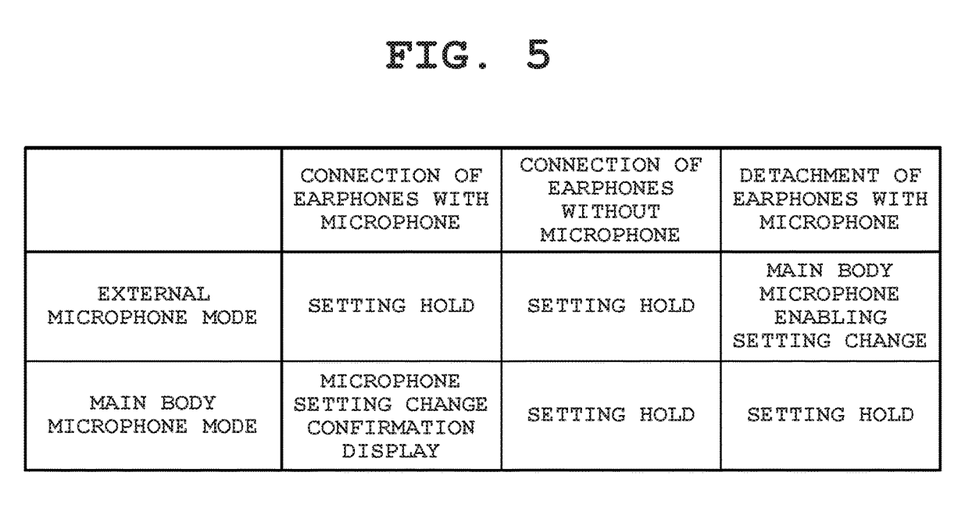
FIG. 5 is a diagram showing a modification example applicable to the electronic device according to the embodiment.
Figure 6:
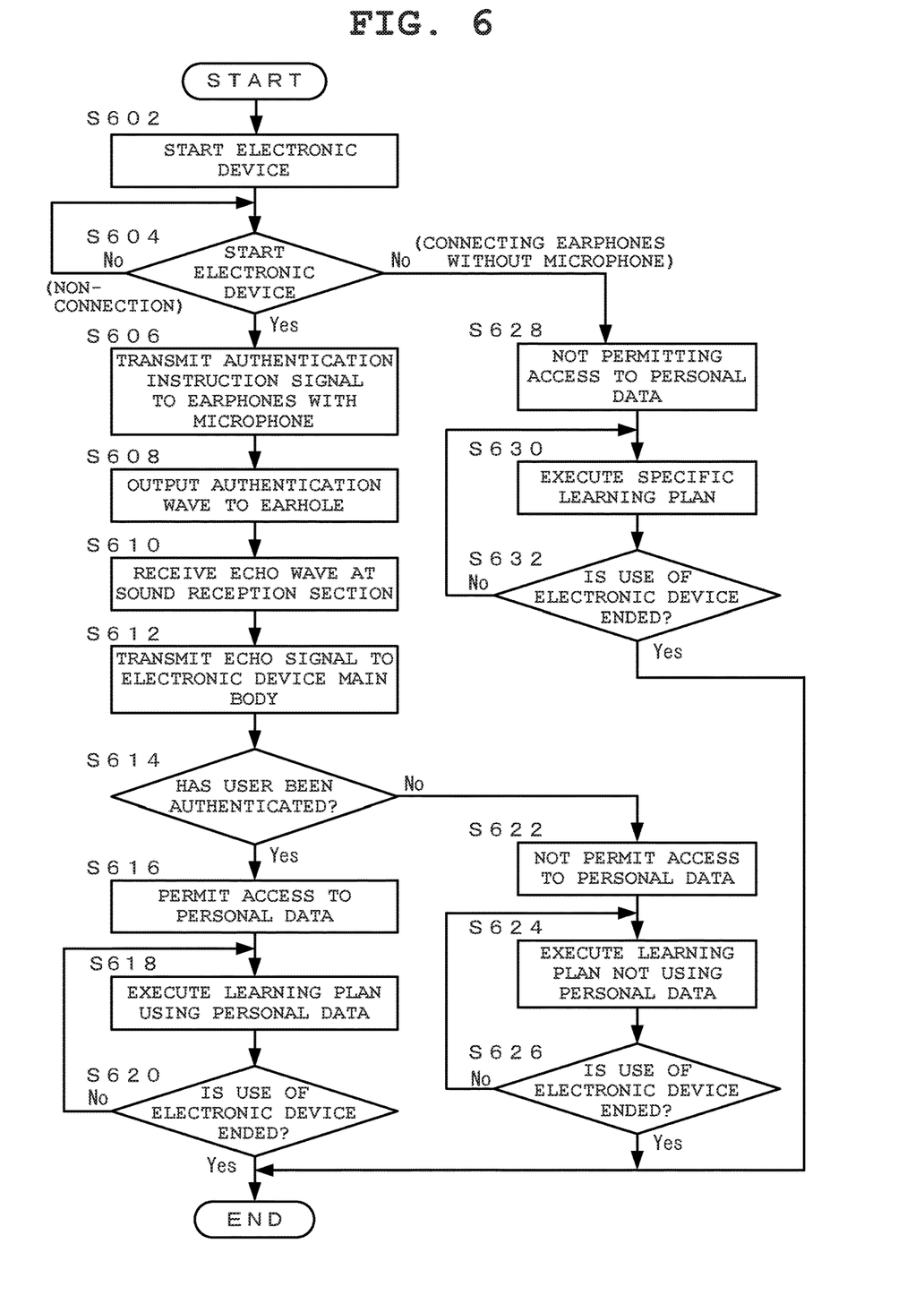
FIG. 6 is a flowchart showing an example of a control method for the electronic device according to the modification example of the embodiment.

Next, a modification example applicable to the above-described embodiment is described. FIG. 5 is a diagram showing modification examples applicable to the electronic device according to the present embodiment. FIG. 6 is a flowchart showing an example of an electronic device control method according to present modification. Here, descriptions of processing operations that are the same as those of the above-described embodiment are omitted.

In the above-described embodiment, the electronic device 100 judges that the audio devices 200 such as earphones with a microphone has been connected, acquires authentication information based on biological information unique to the user, and performs personal authentication. That is, in the above-described embodiment, the audio device 200 is judged to have been connected under the assumption that this audio device 200 connected to the electronic device 100 is earphones or the like with a microphone suitable for the above-described processing for acquiring authentication information unique to the user (for example, a regular product specified by a maker of electronic devices or a product of quality according to that), and the processing for acquiring authentication information and personal authentication processing for identifying the user are executed with the judgment as a trigger.

In the modification example according to the present embodiment, the electronic device 100 is structured to have a built-in sound section which inputs or outputs a voice, and a control method is adopted which can support a case where earphones having no microphone function (earphones without a microphone) is connected as the audio device 200.

Specifically, as an operational mode, the electronic device 100 has an external microphone mode which enables (or prioritizes) the input or output of a voice or the like via earphones with a microphone connected as the audio device 200, and a main body microphone mode which enables (or prioritizes) the input or output of a voice or the like via the built-in sound section in the electronic device 100. As a result, the operation state of the electronic device 100 is controlled in accordance with each mode.

(External Microphone Mode)

For example, in the case where the electronic device 100 is in the "external microphone mode" which enables the input or output of a voice or the like via earphones with a microphone as shown in FIG. 5, when earphones with a regular microphone are connected to the I/F section 130 as the audio device 200 (Yes at Step S604) as shown in the flowchart of FIG. 6, the arithmetic processing section 140 maintains the setting of the external microphone mode as it is. Then, the arithmetic processing section 140 executes a series of processing operations (authentication information acquisition processing, personal authentication processing, learning plan execution operation, and judgment as to the end of the electronic device) shown at Steps S606 to S620 as with Steps S306 to S320 of the control method shown in the above-described embodiment (FIG. 3).

That is, by the arithmetic processing section 140 transmitting an authentication instruction signal to the earphones with the microphone serving as the audio device 200 (Step S606), an authentication wave is outputted into each earhole of the user from the earphones with the microphone (Step S608). Next, when an echo wave occurred by reflection inside the user's earhole is received by the earphones with the microphone (Step S610) and transmitted as an echo signal (Step S612), the arithmetic processing section 140 executes personal authentication processing which identifies the user based on authentication information included in the echo signal (Step S614). When the user is identified by the personal authentication processing and authenticated (Yes at Step S614), the arithmetic processing section 140 permits access to the personal data of the user (Step S616), and executes a learning plan or a function using the personal data (Step S618).

Conversely, when the user using the electronic device 100 is not authenticated (No at Step S614) in the above-described personal authentication processing (Step S614), the arithmetic processing section 140 may execute the same processing operations (not permit access to personal data, non-authentication notification and end of use of the electronic device) as those of Steps S322 to S324 of the control method shown in the above-described embodiment (FIG. 3), or may execute a series of processing operations of Steps S622 to S626 shown in the flowchart of FIG. 6.

That is, when the user of the electronic device is not authenticated, the arithmetic processing section 140 does not permit access to personal data registered in advance (Step S622), and executes a learning plan or a function supporting the input or output of a voice or the like in a set state where personal data is not used (Step S624).

Here, the learning plan at the above-described Step S624 which does not use personal data is described using English-conversation learning shown in FIGS. 4A and 4B as an example. When the user selects an arbitrary item on the menu list on the home screen displayed on the display section 110 of the electronic device 100 as shown in FIG. 4A (a), for example, the arithmetic processing section 140 executes the selected learning plan in a set state where the user's personal data is not used. For example, when the user selects "PRONUNCIATION TRAINING", the arithmetic processing section 140 controls the display section 110 to perform display for inputting execution conditions and the like for the learning plan ("QUESTION SETTING METHOD" shown in FIG. 4A (c) and "RANGE OF QUESTIONS" shown in FIG. 4A (d)). Here, since a past record with respect to the user's learning plan is not referred to in the set state where personal data is not used, an item of "UNTRIED QUESTIONS" is not displayed on the list of the range of questions shown in FIG. 4A (d) and, for example, only items of "difficulty" is displayed.

Then, when the user inputs arbitrary execution conditions and the like, the arithmetic processing section 140 gives an example sentence based on these conditions as shown in FIG. 4A (e) by displaying it on the display section 110, and replays and outputs a model voice via the audio device 200 as with the above-described embodiment. When the user inputs the example sentence via the audio device 200 after the replay of the model voice, the arithmetic processing section 140 records this user's voice as shown in FIG. 4A (f), and executes pronunciation analysis processing based on comparison between the user's voice data and the model voice data for the given example sentence, as shown in FIG. 4B (g). The result of the pronunciation analysis processing is displayed on the display section 110 in the form of a circle graph, etc. which are easier to understand, as shown in FIG. 4B (h).

Here, in the set state where personal data is not used, no past record with respect to the user's learning plan is referred to. Therefore, the analysis result of the "last time" shown in FIG. 4B(h) is not displayed and only the result of this time is displayed. In addition, the analysis result (namely, learning result) of this time is not stored as a past record because the user has not been authenticated.

Then, when the electronic device is not ended (is continued to be used) after the end of the learning plan without personal data (No at Step S626), the arithmetic processing section 140 returns to Step S624, and continues the state where a learning plan which does not use personal data can be executed. On the other hand, when completing the use of the electronic device (Yes at Step S626), the arithmetic processing section 140 ends or suspends all the operations in the electronic device so as to end the use of the electronic device.

Note that, when the earphones with the microphone which has been connected to the electronic device 100 is removed in the external microphone mode as shown in FIG. 5, the arithmetic processing section 140 changes the current mode setting to enter the main body microphone mode so as to set the state where the input or output of a voice or the like from the built-in sound section in the electronic device 100 is enabled.

At Step S604, in a case where earphones without a microphone are connected as the audio device 200 to the I/F section 130 (No at Step S604) in the connection judgment processing (Step S604) of the above-described audio device 200, the setting of the external microphone mode is maintained as it is. However, since the earphones are an audio device to which a voice or the like cannot be inputted (that is, they are not suitable for authentication information acquisition processing), the arithmetic processing section 140 prohibits access to the personal data of the user without executing personal authentication processing (Step S628), and executes a specific learning plan or a function where pronouncing is not required (Step S630). Here, for example, a list of example sentences is displayed on the display section 110 of the electronic device 100 and the user selects an arbitrary example sentence. Then, the arithmetic processing section 140 displays the example sentence on the display section 110, and replays and outputs a model voice therefor via the earphones without a microphone. That is, in this state, a learning plan specialized in listening is executed.

(Main Body Microphone Mode)

In the case where the electronic device 100 is in the "main body microphone mode" which enables the input or output of a voice or the like via the built-in sound section as shown in FIG. 5, when earphones with a regular microphone is connected to the I/F section 130 as the audio device 200 (Yes at Step S604), the arithmetic processing section 140 displays on the display section 110 a message prompting the user to determine whether to change the current microphone setting from a main body microphone to that of earphones with a microphone as shown in the flowchart of FIG. 6. Then, when the user changes the microphone setting, the arithmetic processing section 140 changes the current mode setting from the main body microphone mode to the external microphone mode, so that the electronic device 100 enters a state where the input or output of a voice or the like by the earphones with the microphone connected thereto is enabled. Hereinafter, a series of processing operations is executed which is the same as that performed when earphones with a regular microphone is connected in the above-described "external microphone mode" (authentication information acquisition processing, personal authentication processing, learning plan execution operation, and judgment as to the end of the electronic device at Steps S606 to S620).

Note that, when the earphones with the microphone which has been connected to the electronic device 100 is removed in the main body microphone mode as shown in FIG. 5, the arithmetic processing section 140 maintains the current mode setting as it is and sets the state where the input or output of a voice or the like from the built-in sound section in the electronic device 100 is enabled.

At Step S604, in a case where earphones without a microphone are connected as the audio device 200 to the I/F section 130 (No at Step S604) in the connection judgment processing (Step S604) of the above-described audio device 200, the setting of the main body microphone mode is maintained as it is, and the state of the electronic device 100 is maintained in which the input of a voice or the like via the microphone of the sound section is enabled. Here, since the input of a voice or the like by the earphones without the microphone cannot be performed (that is, they are not suitable for authentication information acquisition processing), the arithmetic processing section 140 prohibits access to the personal data of the user without executing personal authentication processing (Step S628), and executes a specific learning plan or a function requiring the input or output of a voice or the like via the microphone of the sound section and the earphones without a microphone connected to the I/F section 130 (Step S630). That is, in this state, a learning plan or a function supporting the input or output of a voice or the like is executed in a set state where the user's personal data is not used, as with the above-described Step S624.

As such, in this modification example, in the electronic device 100 using the built-in sound section and the audio device 200 connected externally, acoustic means for inputting or outputting a voice or the like can be appropriately set, and the propriety of access to the personal data of a user or the propriety of the use of the personal data in a learning plan or the like can be set based on various types of conditions.

As a result of this configuration, only by wearing acoustic means in ears as a series of learning preparations without adding new components to the electronic device and without performing an operation aimed only at personal authentication, the user can execute personal authentication processing which automatically and appropriately identifies the user based on an operation mode (the external microphone mode or the main body microphone mode) set in the electronic device and acoustic means used for a learning plan and the like, and can favorably view or update the personal data of the user, or use a learning plan or a function using the personal data. Accordingly, even if the electronic device 100 is stolen or lost, personal data such as a learning plan and the progress thereof and an achievement level (results) of learning are not disclosed.

(Explanatory Notes)

In the embodiment and the modification example described above, personal authentication processing that specifies a user based on acoustic properties inside the earholes is executed using the audio device 200 having inner or canal type earphones structured to be inserted into user's earholes. However, the present invention is not limited thereto. That is, the present invention may have any structure as long as biological information unique to a user can be acquired as authentication information by an audio device that is worn on a user's ear portion or head portion. For example, as this audio device, headphones with an encapsulated or open type microphone can be used as long as biological information acquired as authentication information fulfills conditions such as the accuracy or amount of information available to personal authentication processing.

Also, in the present embodiment, the case has been described in which personal authentication is performed for one (single) user. However, the present invention is not limited thereto and is favorably applicable even when a plurality of users shares one electronic device. In that case, in personal authentication processing, authentication information acquired by the audio device 200 worn on a user is compared with each user's authentication information registered in advance, whereby the current user of the electronic device is identified, and only access to the personal data of this authenticated user is permitted from among a plurality of personal data registered for every user in advance. Then, a learning plan or a function using the personal data is executed.

Moreover, in the present embodiment, personal authentication processing with respect to a user is executed by the arithmetic processing section 140 of the electronic device 100. However, the present invention is not limited thereto and, for example, personal authentication processing may be executed by a server on a network. In recent years, as a countermeasure to information disclosure and the like, a system has been increased in which important information or confidential information such as accounting information and customer data are stored not in an information processing system but in a server on a network. In the present invention as well, a configuration may be adopted in which personal data of one or a plurality of users registered in advance are stored not in the memory section 150 in the electronic device 100 but in a server on a network, and personal authentication processing of a user is executed on the server. By this configuration, the structure of the electronic device 100 can be simplified, a processing load thereon can be significantly reduced, and reliability related to its security can be improved. In a traditional method using biological information, an authentication device is required to be provided, which may be large in scale. In addition, in the case of fingerprint authentication or vein pattern authentication, a glove or the like is required to be removed. In the case of face authentication, a mask or the like is required to be removed. However, the present invention does not have these requirements.

Furthermore, in the present embodiment, the electronic device using earphones with a microphone has been applied to an electronic learning device such as an English-conversation learning machine or an electronic dictionary. However, the present invention is not limited thereto and may be applied to other electronic devices having an equivalent function, such as a smart phone, a tablet terminal, a portable game machine and the like. In addition, as personal data for which the propriety of access is judged by personal authentication processing, past records in English-conversation learning such as learning plans and learning results have been described. However, the present invention is not limited thereto. That is, the above-described personal data may be any data as long as it can be used by an electronic device having earphones with a microphone and is information unique to a user. Accordingly, the present invention may be applied to medical equipment, health-care administration apparatus and the like which measure a body temperature or a pulse by a sensor inserted into an inner ear, and store the results as personal data.

While the present invention has been described with reference to the preferred embodiments, it is intended that the invention be not limited by any of the details of the description therein but includes all the embodiments which fall within the scope of the appended claims.

What is claimed is:

1. An audio device comprising:
 a sound emission section which outputs a sound into an earhole of a user;
 a sound reception section to which a sound from the earhole of the user is inputted;
 an interface section which is connected for communication with an electronic device; and
 a hardware processor,
 wherein the hardware processor is configured to perform:
 a first operation of converting a signal received from the electronic device via the interface section into a first sound signal corresponding to a voice or a musical sound, and outputting the first sound signal via the sound emission section,
 a second operation of converting a voice of the user inputted via the sound reception section into a first electrical signal, and transmitting the first electrical signal to the electronic device via the interface section,
 a third operation of converting an authentication instruction signal received from the electronic device via the interface section into a second sound signal having a specific frequency, and outputting the second sound signal via the sound emission section as an acoustic wave for authentication, and
 a fourth operation of converting an echo wave inputted via the sound reception section and created by the acoustic wave for authentication being reflected inside the earhole of the user into a second electrical signal, and transmitting the second electrical signal to the electronic device via the interface section.

2. The audio device according to claim 1, wherein, before a voice output function by the first operation or a voice input function by the second operation is provided to the electronic device, a personal authentication function by the third operation and the fourth operation is provided to the electronic device.

3. The audio device according to claim 2, wherein, before the voice output function of causing the user to hear a voice by the first operation or the voice input function of inputting a voice of the user by the second operation is provided to the electronic device, the personal authentication function for identifying whether the user is a target person of the voice output function or the voice input function by the third operation and the fourth operation is provided to the electronic device.

4. The audio device according to claim 1, wherein the electronic device stores personal data of the user, and
wherein, in a case of receiving, via the interface section, the authentication instruction signal that is to be transmitted by the electronic device when access to the personal data of the user is required, the hardware processor performs the third operation and the fourth operation.

5. The audio device according to claim 1, wherein the electronic device performs language learning by using one of the sound emission section and the sound reception section, and
wherein, in a case of receiving, via the interface section, the authentication instruction signal that is to be transmitted before the electronic device performs language learning, the hardware processor performs the third operation and the fourth operation.

6. The audio device according to claim 5, wherein the electronic device performs one of listening learning by using the sound emission section and speaking learning by using the sound reception section.

7. The audio device according to claim 5, wherein the electronic device stores personal data of the user regarding the language learning, and
wherein, in a case of receiving, via the interface section, the authentication instruction signal that is to be transmitted by the electronic device when access to personal data of the user is required for performing the language learning, the hardware processor performs the third operation and the fourth operation.

8. A control method for an audio device including a sound emission section which outputs a sound into an earhole of a user, a sound reception section to which a sound from the earhole of the user is inputted, and an interface section which is connected for communication with an electronic device, wherein the control method comprises:
converting a signal received from the electronic device via the interface section into a first sound signal corresponding to a voice or a musical sound, and outputting the first sound signal via the sound emission section,
converting a voice of the user inputted via the sound reception section into a first electrical signal, and transmitting the first electrical signal to the electronic device via the interface section,
converting an authentication instruction signal received from the electronic device via the interface section into a second sound signal having a specific frequency, and outputting the second sound signal via the sound emission section as an acoustic wave for authentication, and
converting an echo wave inputted via the sound reception section and created by the acoustic wave for authentication being reflected inside the earhole of the user into a second electrical signal, and transmitting the second electrical signal to the electronic device via the interface section.

9. A non-transitory computer-readable storage medium having stored thereon a program that is executable by a computer in an audio device including a sound emission section which outputs a sound into an earhole of a user, a sound reception section to which a sound from the earhole of the user is inputted, and an interface section which is connected for communication with an electronic device, wherein the program controls the computer to perform operations comprising:
converting a signal received from the electronic device via the interface section into a first sound signal corresponding to a voice or a musical sound, and outputting the first sound signal via the sound emission section,
converting a voice of the user inputted via the sound reception section into a first electrical signal, and transmitting the first electrical signal to the electronic device via the interface section,
converting an authentication instruction signal received from the electronic device via the interface section into a second sound signal having a specific frequency, and outputting the second sound signal via the sound emission section as an acoustic wave for authentication, and
converting an echo wave inputted via the sound reception section and created by the acoustic wave for authentication being reflected inside the earhole of the user into a second electrical signal, and transmitting the second electrical signal to the electronic device via the interface section.

* * * * *